(12) United States Patent
Wolff

(10) Patent No.: US 6,699,561 B2
(45) Date of Patent: Mar. 2, 2004

(54) ACTIVATED CARBON MOLDED BODY AND USE THEREOF

(75) Inventor: Thomas Wolff, Münchberg (DE)

(73) Assignee: Helsa-Werke Helmut Sandler GmbH & Co. KG, Gefrees (DE)

(*) Notice: Subject to any disclaimer, the term of this patent is extended or adjusted under 35 U.S.C. 154(b) by 0 days.

(21) Appl. No.: 10/066,467

(22) Filed: Jan. 31, 2002

(65) Prior Publication Data
US 2002/0103081 A1 Aug. 1, 2002

(30) Foreign Application Priority Data
Feb. 1, 2001 (DE) .......................... 101 04 882

(51) Int. Cl.⁷ .............................. B32B 3/12
(52) U.S. Cl. ............. 428/116; 428/408; 428/36.9; 428/188; 428/454; 428/474.4; 428/484; 428/364; 428/532; 428/702; 428/703; 428/439; 428/440; 423/414; 423/449.1; 423/445 R; 502/413; 502/416; 106/660; 106/661; 106/662; 106/665; 106/672; 106/677; 106/681; 106/802; 106/803; 106/122; 106/148.1; 106/243; 106/270; 106/271; 422/177; 422/180; 422/211; 422/222

(58) Field of Search ................. 428/116, 117, 428/118, 408, 35.7, 36.9, 188, 454, 474.4, 477.7, 484, 364, 532, 702, 703, 440, 438, 439; 423/414, 445 R, 449.1; 502/413, 416; 106/638, 660, 661, 662, 665, 672, 677, 681, 802, 803, 122, 148.1, 243, 270, 271; 422/177, 180, 211, 222

(56) References Cited

U.S. PATENT DOCUMENTS

| | | |
|---|---|---|
| 4,399,052 A | 8/1983 | Sugino |
| 4,518,704 A | 5/1985 | Okabayashi et al. |
| 5,292,931 A * | 3/1994 | Wirtz et al. |
| 5,510,063 A | 4/1996 | Gadkaree et al. |
| 5,645,853 A * | 7/1997 | Winston et al. |
| 5,664,049 A * | 9/1997 | Kondo et al. |
| 5,678,165 A * | 10/1997 | Wu |
| 5,820,967 A | 10/1998 | Gadkaree |
| 5,914,294 A | 6/1999 | Park et al. |
| 6,097,011 A | 8/2000 | Gadkaree et al. |
| 6,284,705 B1 | 9/2001 | Park et al. |
| 6,300,466 B1 | 10/2001 | Heschel et al. |

FOREIGN PATENT DOCUMENTS

| | | |
|---|---|---|
| DE | 4225272 A1 | 2/1994 |
| DE | 19752593 A1 | 7/1999 |
| EP | 0492081 A1 | 7/1992 |

* cited by examiner

Primary Examiner—Deborah Jones
Assistant Examiner—Wendy Boss
(74) Attorney, Agent, or Firm—Hoffmann & Baron, LLP

(57) ABSTRACT

An activated carbon molded body, more particularly in honeycomb form and for use as an adsorption filter, can be produced from a mixture including activated carbon, water, novolak powder, clay, cellulose ether, liquid starch, wax, polyacrylamide and soap, by a procedure involving thoroughly mixing the constituents, extruding the mixture to form a monolithic molded body and cutting same to size, drying the body and effecting pyrolysis thereof. The adsorption filter produced therefrom can be regenerated by electrical heating under specified conditions.

15 Claims, 6 Drawing Sheets

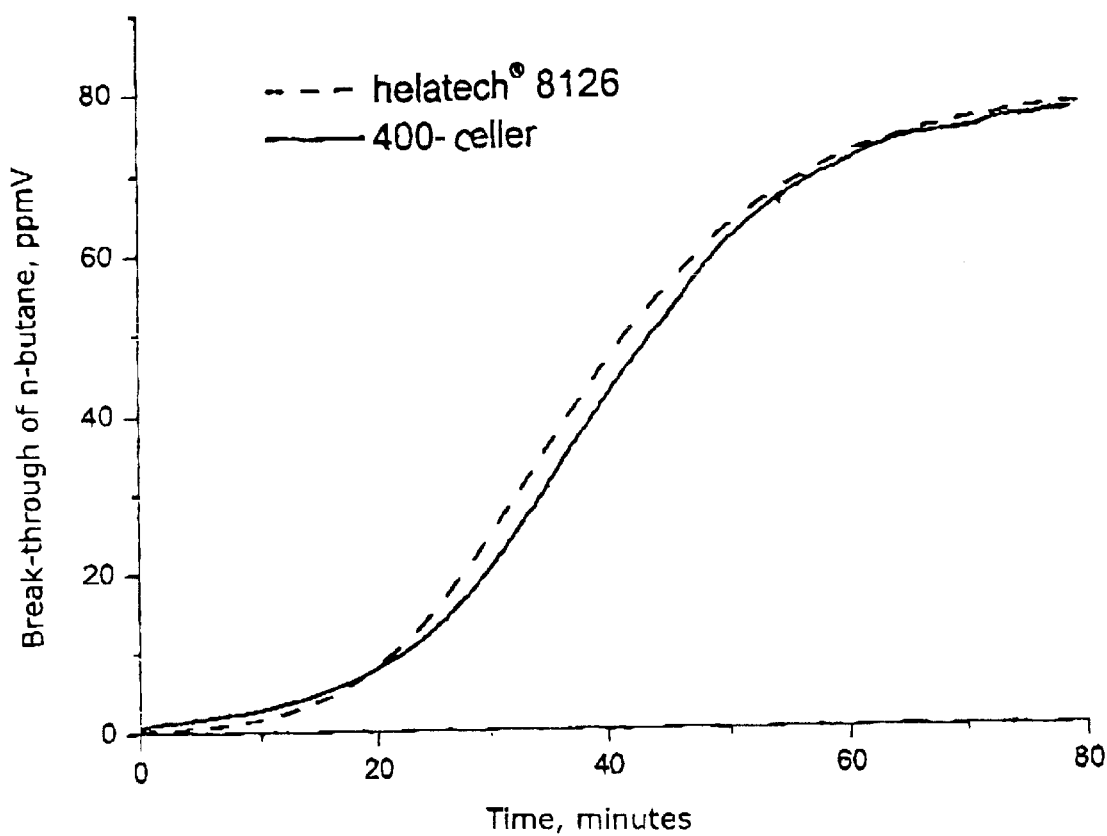
FIGUR 1

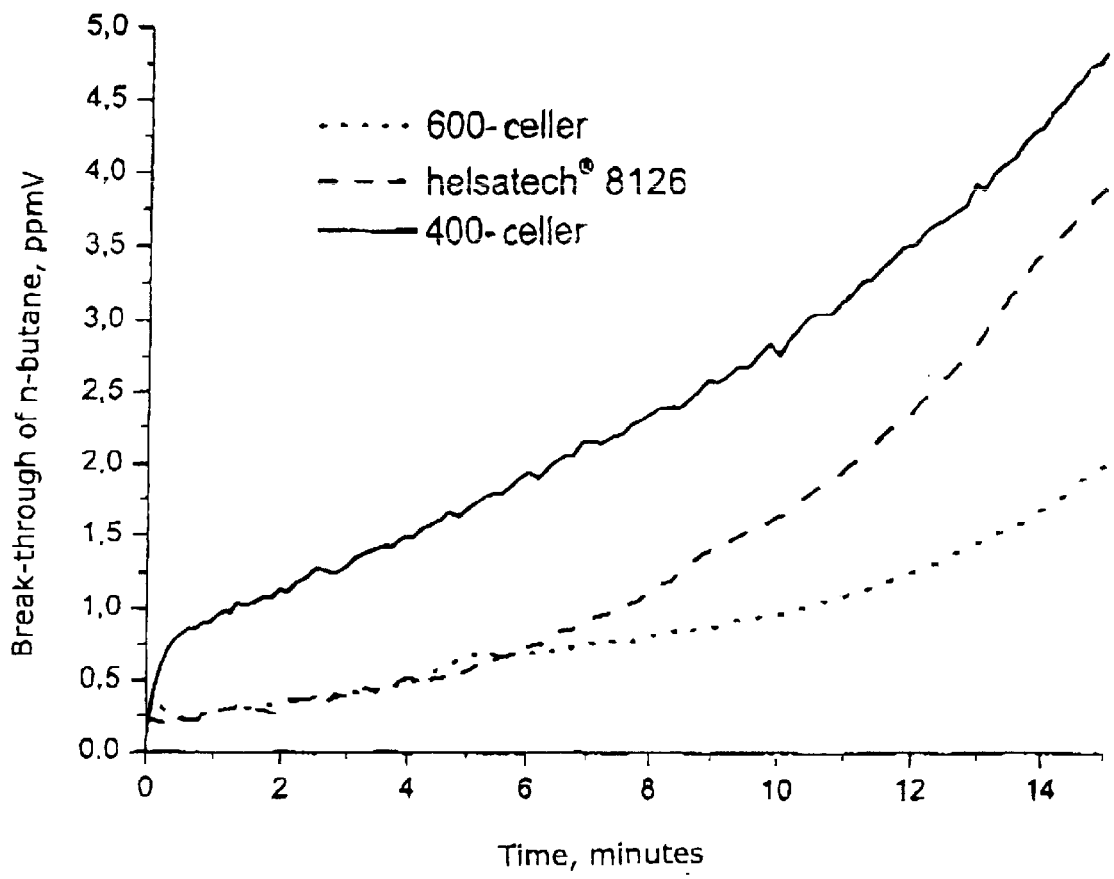
FIGUR 2

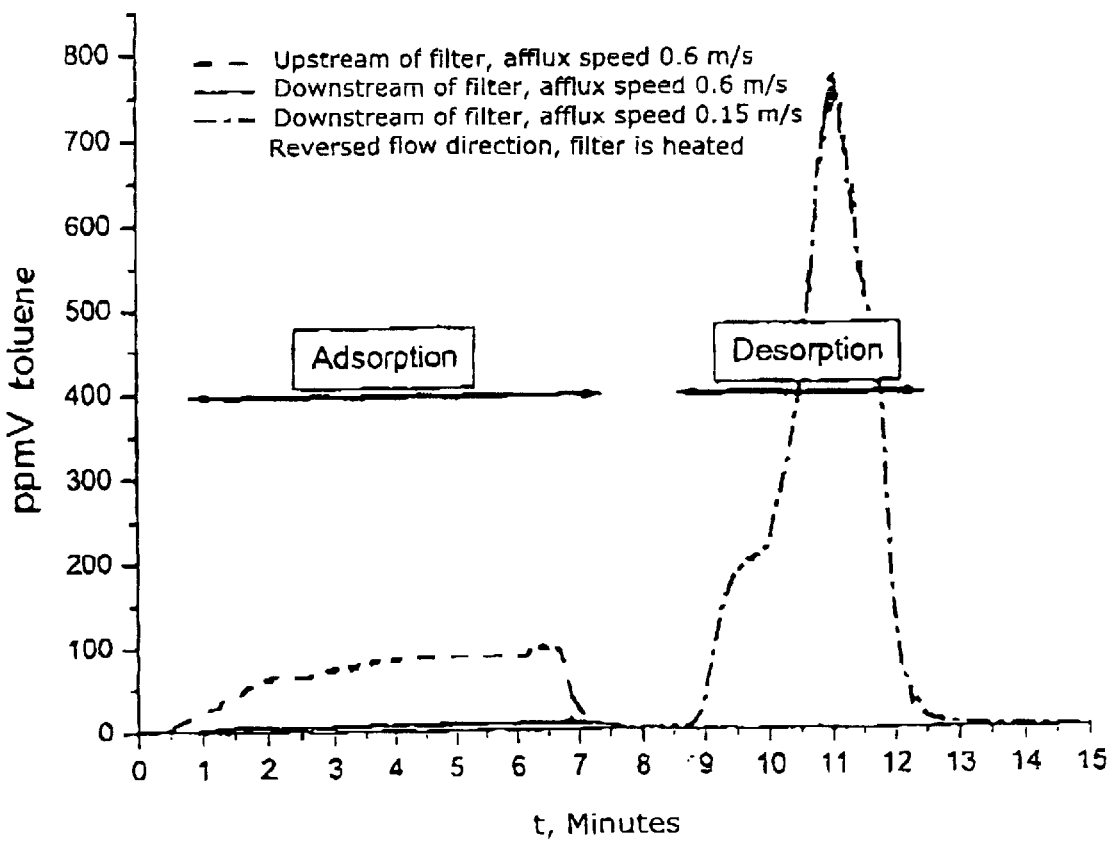
FIGUR 3

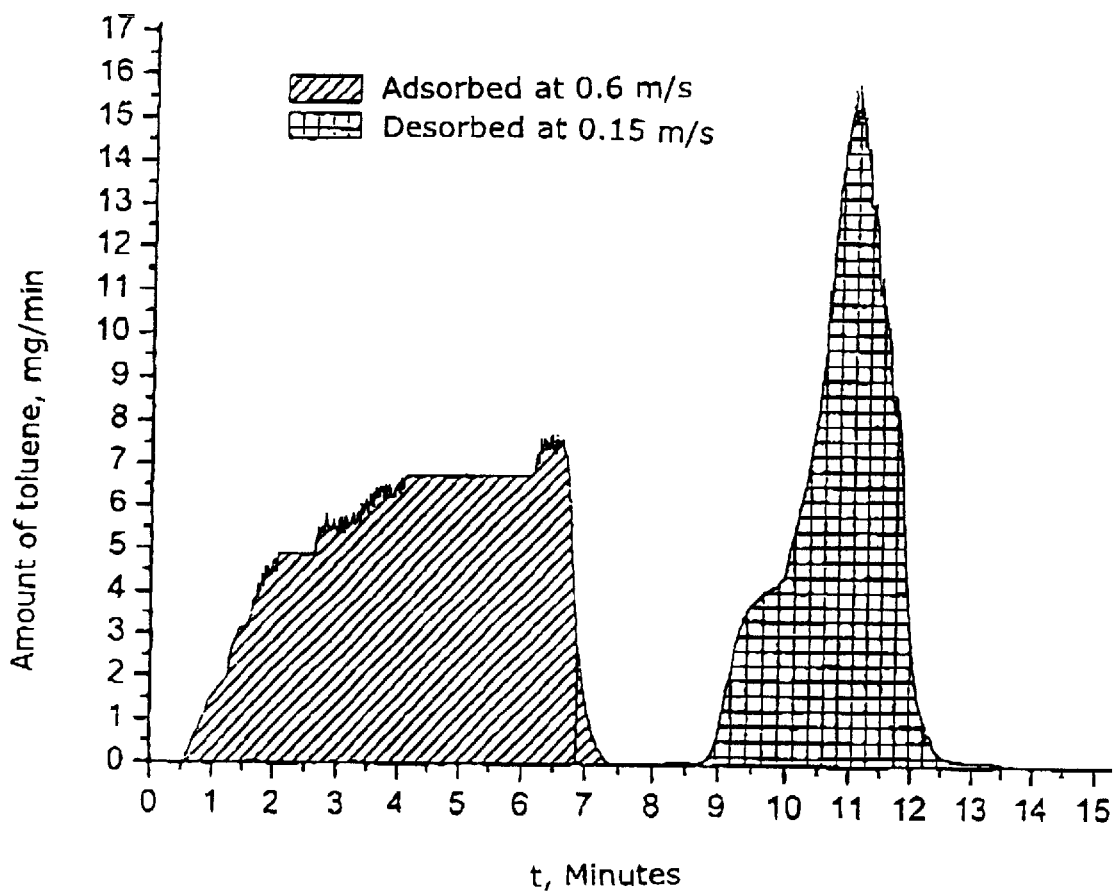
FIGUR 4

FIGUR 5
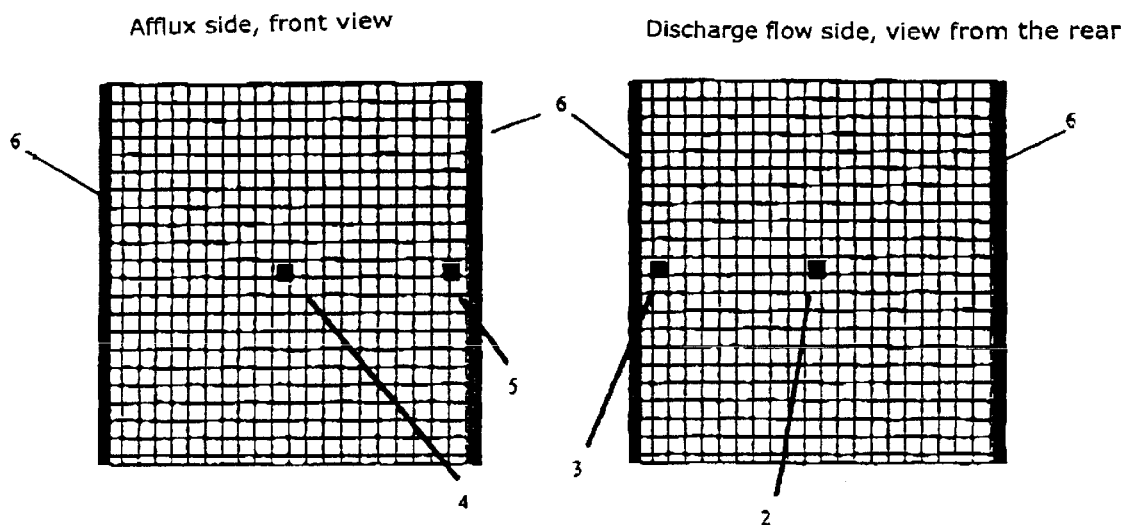
FIGUR 6
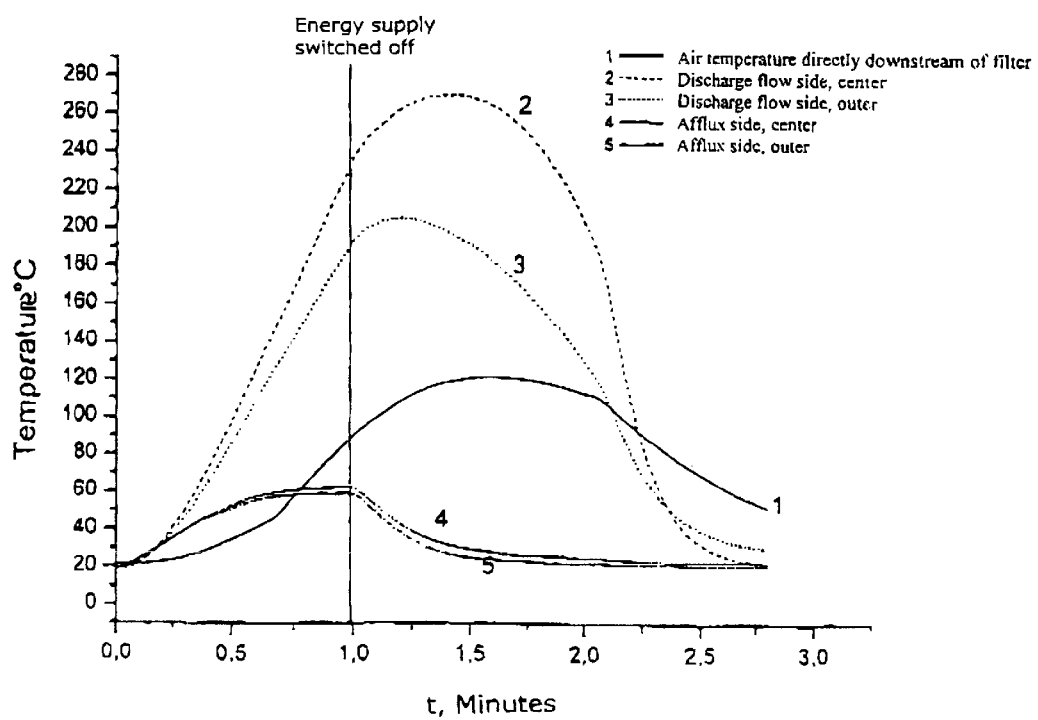

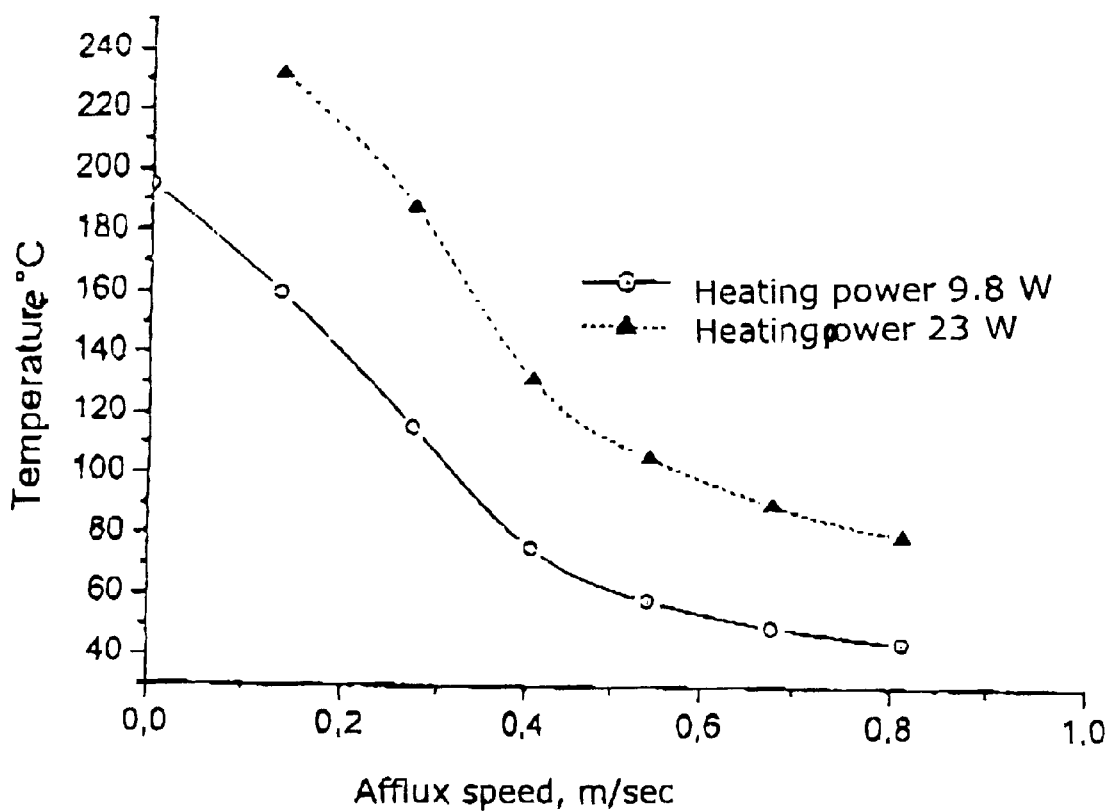
FIGUR 7 ics ACTIVATED CARBON MOLDED BODY AND
USE THEREOF

This application asserts the priority date of German Patent application No. 10104882.3, which was filed on Feb. 1, 2001.

FIELD OF THE INVENTION

The present invention concerns an activated carbon molded or shaped body, referred to hereinafter as a molded body.

The activated carbon molded body may be more particularly for example in honeycomb form and may be used as an adsorption filter.

The invention also concerns uses of the activated carbon molded body.

BACKGROUND OF THE INVENTION

In the area relating to passenger compartment air filtration in motor vehicles, the requirements being made on odor filter systems are becoming increasingly demanding. The available structural space is becoming smaller and smaller and the filtration properties are to be better and better, with as far as possible a further reduction in the air resistance of the filter. A further problem is that the passive systems which are used nowadays can only be viewed as pure odor filter systems. Pollutants such as benzene and toluene, over the service life of the filter, become increasingly concentrated therein and are discharged again as from a certain level of loading in the filter. It is possible to avoid that undesirable side effect within the period of use of such a filter by increasing the amount of sorbents used. That inevitable results in an increase in the amount of structural space required or an increase in air resistance. Both of those are absolutely undesirable for new developments for motor vehicles and for the major part also cannot be implemented from a technical point of view in the present day air conditioning systems. Another alternative would be the premature replacement of a filter of that kind, which however is highly cost-intensive and in addition particularly time-intensive, as the replacement of such a filter generally has to be carried out in a specialist workshop.

A similar problem arises in the area of the tank venting systems for motor vehicles. The available structural space is becoming smaller and smaller but the demands on the filter systems are ever increasing for ecological reasons. Hitherto a reduction in the vapor fuels emitted from a tank has been achieved by the use of additional activated carbon. As there is only a limited structural space available it is not possible to travel too far along that path. That applies in particular if the admissible amount of fuel which passes into the environment within 24 hours has to be reduced to about 20% of the previously involved value, as is required for example in California as from the year 2001.

Many different endeavours have already been undertaken to satisfy the above-indicated requirements. In that respect, the men skilled in the art agree that these technical problems can only be satisfactorily resolved with adsorption filters of honeycomb form, as the honeycomb geometry affords the advantage of a large surface area for contact with a fluid flowing therethrough and only a low pressure drop at the filter.

Therefore, various operating procedures have been set forth, for producing activated carbon molded bodies of that kind involving a honeycomb structure. U.S. Pat. Nos. 4,399, 052 and 5,820,967 each disclose honeycomb structures in which a starting material is extruded and then pyrolised. In that case the starting material is a mixture of various constituents, but activated carbon is not contained in the starting material. The honeycombs disclosed admittedly enjoy good abrasion resistance and hardness as well as suitable electrical conductivity for appropriate regeneration, but the mesoporous adsorber structure which is to be endeavoured to provide for tank ventilation cannot be produced with the resins disclosed for production purposes.

U.S. Pat. No. 5,515,063 proposes the production of an activated carbon molded body, without making use of an extrusion process. In this case, the passages in the activated carbon molded body are formed by a passage-forming material. Under pyrolysis conditions, the passage-forming material at least partially evaporates and leaves the passages behind in the honeycomb structure.

U.S. Pat. Nos. 6,097,011 and 4,518,704 disclose activated carbon molded bodies in which activated carbon is applied to a ceramic structure or matrix. In other words, the stability aspect is ensured by the ceramic main body, but the adsorption capability is limited because the total proportion of activated carbon in such activated carbon molded bodies is relatively low.

EP 0 492 081 discloses a honeycomb structure which is produced with the avoidance of a sintering operation at elevated temperatures. Therefore, production of the proposed honeycomb structure involves avoiding the use of clay or similar materials as the starting material, as relatively high temperatures would be required to produce a ceramic support structure. On the other hand, the use of relatively high temperatures for processing the main body of that structure is not possible as that results in cracks and fissures in the honeycomb structure.

Finally, U.S. Pat. No. 5,914,294 discloses a monolithic activated carbon molded body which, besides methyl cellulose, basically does not contain any organic constituents in the initial mixture employed. This has the disadvantage however or requiring relatively high combustion temperatures for producing the honeycomb structure.

SUMMARY OF THE INVENTION

An object of the present invention is to provide an activated carbon shaped or molded body which can be produced more particularly in honeycomb form and can be used as an adsorption filter.

Another object of the present invention is to provide an activated carbon body which is such that it can be produced by a relatively simple operating procedure.

Still another object of the present invention is to provide a use of an activated carbon molded body.

Yet another object of the present invention is to provide a process for the regeneration of an activated carbon molded body, which involves simple implementation with enhanced operational results.

In accordance with the present invention the foregoing and other objects are attained by an activated carbon molded body, more particularly for example in honeycomb form and for example for use as an adsorption filter, which can be obtained from a mixture containing activated carbon, water, novolak powder, clay, cellulose ether, liquid starch, wax, polyacrylamide and soap, by thoroughly mixing the constituents, extruding the mixture to form a monolithic shaped or molded body and cutting same to size, drying the molded body produced and pyrolysis thereof.

In the use aspect the foregoing and other objects are achieved by use of an activated carbon molded body as an adsorption filter.

Furthermore in the regeneration process the foregoing and other objects are attained by a process for the regeneration of an adsorption filter wherein the adsorption filter is subjected to the action of a heating power of between 10 and 35 W and more particularly between 10 and 23 W and a desorption air flow is set to between 0.1 and ≧0.65 m/sec.

The activated carbon molded body in accordance with the invention, after the pyrolysis operation, has an advantageously high activated carbon component of more than 70% by weight, which can afford persuasive efficiency data. Another particularly surprising consideration is the especially good electrical conductivity of the activated carbon body according to the invention, which makes it possible to implement regeneration of an activated carbon molded body which is used as an adsorption filter, by applying an electrical voltage thereto. The specific insulation resistance of the activated carbon molded body according to the invention, in relation to a cube with an edge length of 1 cm and measured between two mutually opposite side faces thereof, is between 0.1 and 5 Ω at a temperature of 23° C.

The mixture of the starting materials from which the item referred to as the green body is produced contains between 30 and 40% by weight of activated carbon, preferably between 32 and 38% by weight and particularly preferably between 34 and 37% by weight. The activated carbon is basically the main adsorption means in the activated carbon body according to the invention. The endeavour is therefore to keep the proportion thereof in the starting mixture as high as possible. Furthermore, by using a defined activated carbon, that is to say an activated carbon involving a specific pore size and a specific pore size distribution, it is already possible to implement pre-setting in relation to a subsequent area of use. In order however to be able to ensure economical processing and a stable end product, it is however necessary to add other auxiliary substances and additives. In that respect the man skilled in the art is familiar with the notion that activated carbon alone and in particular without the use of any binding agents and other additives is practically impossible to extrude and is also of inadequate stability in respect of shape. In accordance with the invention the proportion of activated carbon in the starting mixture is between 30 and 40% by weight. With a proportion thereof in the range of between 32 and 38% by weight of activated carbon in the mixture of the starting constituents, that overall affords a good adsorption capability with good product properties in terms for example of stability and electrical conductivity while with a proportion of between 34 and 37% by weight of activated carbon in the mixture of starting constituents, it is possible to obtain a product which at the present time is considered to be an optimum and which satisfies the demands made in respect of an adsorption filter, while at the same time the mixture of the starting constituents can be particularly well processed.

Water contained in the starting mixture is intended to ensure flowability and extrudability of the mixture of the starting constituents. It is generally present in the starting mixture in a proportion of between 23 and 34% by weight, preferably in a proportion of between 25 and 32% by weight and particularly preferably in a proportion of between 27 and 31% by weight.

The novolak which is used in accordance with the invention as a binding agent is a partially cross-linked phenol formaldehyde resin in powder form, which is of a melting point of between 80 and 160° C., in particular between 100 and 140° C. The novolak powder is contained in the starting mixture in a proportion of between 5 and 14% by weight, preferably in a proportion of between 8 and 14% by weight, more preferably in a proportion of between 10 and 130% by weight and particularly preferably in a proportion of between 11 and 12% by weight. Liquid phenol formaldehyde resins, referred to as resols, completely wet the activated carbon used and in part penetrate deeply into the pores which are present, and for that reason in accordance with the invention novolaks in powder form are employed. In that respect a particularly low degree of wetting of the activated carbon is achieved by virtue of using a novolak with a high degree of cross-linking.

In accordance with the present invention clay is present in the starting mixture in a proportion of between 5 and 50% by weight, preferably between 5 and 25% by weight and particularly preferably between 5 and 10% by weight and serves as a filler for hardening purposes while at the same time also serving as an extrusion additive or aid, by virtue of its flake or sheet-like structure. In that case it is possible to achieve a higher level of strength for the activated carbon molded body by virtue of an increase in the proportion of clay, which however results in a lower level of adsorption capacity of the activated carbon molded body, because of the comparatively smaller proportion of activated carbon. The added cellulose ether contributes to green stability and homogenises the mixture of activated carbon, novolak and clay, insofar as it prevents or at least sufficiently slows down separation of those constituents, by virtue of different densities. Cellulose ether is therefore contained in the starting mixture in a proportion of between 0.5 and 5% by weight, preferably in a proportion of between 1 and 4% by weight and particularly preferably in a proportion of between 2 and 3% by weight.

The liquid starch which in accordance with the invention is included in the starting mixture forms a stable lattice upon drying of the molded body produced from the starting mixture, and is thus of particular significance in regard to stability of shape of the green body. In accordance with the invention the liquid starch is contained in the starting mixture in a proportion of between 5 and 10% by weight, preferably in a proportion of between 6 and 9% by weight and particularly preferably in a proportion of between 7 and 8% by weight.

The wax contained in the starting mixture according to the invention assists with the shapinq or molding action and is contained in the starting mixture in a proportion of between 2 and 8% by weight, preferably in a proportion of between 3 and 6% by weight and particularly preferably in a proportion of between 4 and 5% by weight.

Polyacrylamide is also a binding agent which contributes to green stability and is contained in the starting mixture according to the invention in a proportion of between 0.2 and 1.2% by weight, preferably in a proportion of between 0.3 and 1./0% by weight and particularly preferably in a proportion of between 0.5 and 0.9% by weight.

Finally, in accordance with the invention the starting mixture contains soap which also serves as an extrusion additive or aid. It is contained in the starting mixture in a proportion of between 1.0 and 2.5% by weight, preferably in a proportion of between 1.2 and 2.0% by weight and particularly preferably in a proportion of between 1.5 and 1.7% by weight.

In a particular configuration of the present invention between 10 and 50% by weight of the proportion of soap in the starting mixture is replaced by graphite. Because, in contrast to the soap, the graphite does not penetrate into the pores of the activated carbon, this embodiment affords end products involving larger surface areas.

In another advantageous embodiment of the present invention, instead of activated carbon and novolak powder, the starting mixture contains a sulfonated polystyrene previously cross-linked with divinylbenzene.

The production of a sulfonation product of that nature is described for example in DE 197 52 593 and DE 199 30 732. The sulfonation products disclosed in those documents are preferably used in this embodiment, in place of activated carbon and novolak powder.

When applying the pyrolysis conditions set forth in the above-indicated documents in the state of the art, for the production of activated carbon from the sulfonation products, it is particularly advantageously possible to produce activated carbon molded bodies which can be matched to the corresponding situation of use in particular in terms of their pore structure and surface area.

For the purposes of further increasing the strength of the molded body, it is also possible to add between 1 and 15% by weight of glass fibers to the starting mixture, in relation to the overall mass of the above-described constituents of the mixture.

In production of the activated carbon molded body according to the invention, firstly the activated carbon is mixed with the novolak powder and then clay is added and further mixing is effected. In the alternative configuration in which the sulfonation product of a polystyrene cross-linked with divinylbenzene is used in place of activated carbon and novolak powder, the sulfonation product is mixed with clay. For that purpose, a mixture of water and cellulose ether is added and further mixing is effected, followed then by the addition of the remaining constituents with further mixing. In that respect the mixing operation is continued in each case to such an extent that the mixture is of adequate homogeneity at the respective moment in time.

After the operation of forming a molded body, in particular by extrusion of the starting mixture produced as described above, the molded body is dried. Many different processes are available to the man skilled in the art for that purpose, such as for example freeze drying or drying using infrared rays. It is preferable however if the molded body produced from the starting mixture is dried in a circulated-air oven at a temperature in the range of between 50 and 80° C. or by means of microwaves. Those two processes ensure that rapid uniform drying takes place. When using microwave technology the drying time can be kept very short, in which respect it is readily possible to achieve a drying time of one minute without cracks or fissures occurring as a result thereof in the molded body or green product.

After the drying operation, the green body is subjected to pyrolysis which essentially serves for carbonisation of the novolak resin used. That is effected at a temperature in the range of between 650° C. and 800° C. under a nitrogen atmosphere. It will be appreciated that in that case the additional components such as wax, soap, the cellulose ether and the starch are also carbonised, in which case however there only remains from the starch and the cellulose ether a carbon lattice in the activated carbon molded body according to the invention.

Preferably, the temperature in the pyrolysis operation is increased until reaching the final temperature, at a heating rate of 5 K/min and the final temperature reached is then held for between 5 and 30 min. Subsequently to the pyrolysis operation, an activation operation can optionally also be effected, whereby additional activation of the carbonised novolak is possible and the active surface area can be increased by about 20%, in relation to the total filter.

Pyrolysis of that kind is also preferred if, as described hereinbefore, a sulfonation product is used instead of activated carbon and novolak in the starting mixture.

In principle the man skilled in the art is familiar with activation conditions for the activation of activated carbon and therefore activation is preferably to be implemented at a temperature of between 700 and 950° C., with between 25 and 35% by volume of water vapor being meteredly added to the activation atmosphere.

An activated carbon molded body as described hereinbefore and in particular such a body in honeycomb form is preferably used as an adsorption filter, by virtue of its particular properties. In a particularly advantageous embodiment electrical contact elements are spaced from each other on the activated carbon molded body, in particular being arranged in mutually opposite relationship. It is possible to apply by way of those contact elements a current which, by virtue of the resistance of the activated molded body, results in heating thereof which, when a suitable air flow is supplied, resulted in desorption of previous adsorbed substances. In that situation, the procedure involves applying a voltage which is preferably switched off again after the maximum concentration of an adsorbed substance in the desorption air flow is exceeded. That makes it possible to effect rapid and very extensive desorption.

The present invention will be described in greater detail hereinafter by means of Examples and in comparison with conventional filters from the state of the art with reference to the accompanying Figures, in which respect the Examples are intended to serve exclusively for better understanding of the invention and not to limit same.

BRIEF DESCRIPTION OF THE DRAWINGS

FIG. 1 is a graph showing the break-through characteristic of an activated carbon molded body according to the invention, in comparison with a filter material from the state of the art, FIG. 2 shows a further graph showing the break-through characteristic of an activated carbon molded body produced according to the invention, in comparison with a filter material from the state of the art, FIG. 3 shows a graph of the adsorption and desorption characteristic of an activated carbon molded body according to the invention, FIG. 4 shows a further graph relating to the adsorption and desorption characteristic, FIG. 5 shows the positioning of temperature sensors with which the temperature pattern in regeneration of the activated carbon molded body according to the invention was measured, FIG. 6 shows the temperature pattern in regeneration of the activated carbon molded body according to the invention at the various measurement locations, and FIG. 7 shows the temperature pattern at the middle of the discharge flow side of the activated carbon molded body according to the invention in dependence on the afflux speed for two different heating powers.

DESCRIPTION OF PREFERRED EXAMPLES

Firstly a starting mixture was produced with a proportion of activated carbon of 35.3% by weight, water 28.7% by weight, novolak powder 11.7% by weight, clay 7.9% by weight, cellulose ether 2.3% by weight, liquid starch 7.3% by weight, wax 4.5% by weight, polyacrylamide 0.7% by weight and soap 1.6% by weight, by thorough mixing. In that case coconut-based activated carbon with an active surface area of 1400 m²/g was used as the activated carbon. The novolak employed was obtained from Bakelite. The starting mixture was extruded through an extruder with a suitable nozzle to form a shaped body with a honeycomb structure and dried in a microwave oven within 1 minute. In that way, two different activated carbon molded bodies were produced, with 62 cells/cm² (400 cpsi) and 93 cells/cm² (600 cpsi) respectively. Those samples had a cross-sectional area of 20.4 cm² and involved a depth of 4.3 cm.

Those activated carbon molded bodies were compared in terms of their adsorption properties to a PU-foam which was provided with an activated carbon granulate and which is commercially available under the name helsatech® 8126 and is used in the mass production of motor vehicles. For comparison purposes, a n-butane break-through measurement procedure was carried out. The cross-sectional area and the through-flow depth of the helsatech® 8126 were also 20.4 cm² and 4.3 cm. Measurements were therefore taken with an afflux speed of 0.6 m/sec, an afflux concentration of 80 ppmV of n-butane, a temperature of 23° C. and a relative humidity of 35%. FIG. 1 shows the break-through curves of the 400-cellers (62 cells/cm²) and the comparative material helsatech® 8126. FIG. 2 shows the initial break-through for the comparative material helsatech® 8126, the 400 cellers (62 cells/cm²) and the 600-cellers (93 cells/cm²).

It can be seen in that respect from FIG. 1 that the efficiency data of the comparative material are already reached at the relatively low cell density of 400 cpsi, in regard to the adsorbed mass. In order however to achieve a comparable initial break-through as in the case of the comparative material, a cell density of 600 cpsi is required, as can be seen from FIG. 2.

It is to be noted that the activated carbon molded bodies produced as examples have been subjected to a pyrolysis operation at 750° C. In that case the honeycomb bodies produced had an active surface area of 800 m²/g. As a comparison, a honeycomb body was also produced, in which the proportion of novolak was reduced to half the proportion specified in the Example described hereinbefore. That afforded a honeycomb body with an active surface area of 1000 m²/g which however is of markedly lesser stability.

Also as a comparison, the proportion of clay in the starting mixture was increased to 50% by weight, while the proportion of the other constituents was correspondingly reduced. The honeycomb body produced in that way admittedly enjoyed a very much higher level of stability than the honeycomb bodies set forth by way of example, but its active surface area was only 450 m²/g.

Using the same process as described above, a 400-celler was produced from the starting mixture according to the invention for a regeneration test, measuring 2.2 cm in length, 2.8 cm in width and 3.6 cm in depth. The filter involved a resistance of 1 Ω at 23° C. and 0.7 Ω at 250° C.

Contacting was effected by way of the narrower side surfaces. For that purpose, a conductivity paste was applied to the side surfaces, and then a copper stranded wire was pressed thereonto over the entire area thereof. When a voltage of 2.8 V is applied the filter heats up within 20 seconds to a temperature of 195° C., which was measured by means of an IR thermometer at the center of the end. A temperature of 165° C. was measured at the edge, directly at the location of contact with the supply of current, that is to say at the copper stranded wire. A temperature of 185° C. was measured at the upper and lower edges and at the side walls interfacing with the ambient air. The greatest fall in temperature towards the contact surfaces is caused by thermal conduction. That can be minimised by suitable insulation.

The filter was acted upon with toluene at an afflux speed of 0.65 m/sec. The concentration of toluene on the afflux side was on average 90 ppmV. Relative air humidity was 60% and the temperature 23° C. FIG. 3 shows the concentration patterns and variations during adsorption and desorption, which are plotted in relation to measurement time. For the desorption operation the direction of flow was reversed, an afflux speed of 0.15 m/sec was set and a voltage of 5 V applied. The current which occurred was 6 A which rose to 7 A until attainment of the maximum level of toluene concentration downstream of the filter. The temperature directly at the air exit of the test piece was 150° C. at the location of that maximum. The voltage was regulated back to zero again after attainment of the maximum concentration.

FIG. 4 plots in relation to the measurement time the amounts of toluene per unit of time which the filter took up during the absorption phase and gave off again during the desorption phase. Integration of the two curves shows that 85% of the adsorbed toluene is given off again or desorbed.

The temperature patterns in the various locations in the filter were recorded during the desorption procedure by applied temperature sensors. In that respect FIG. 5 shows the positions on the discharge flow side at the center as indicated at 2 and at the outside as indicated at 3 and on the afflux side at the center as indicated at 4 and on the outside as indicated at 5. The contact surfaces for the electrical connections are shown by the contact elements 6.

FIG. 6 shows the temperature patterns in the filter during the desorption procedure. The numbering on the individual curves corresponds to the references in FIG. 5. The perpendicular solid line marks the moment in time at which the energy supply was switched off. It is the moment in time at which a temperature of 190° C. is reached on the discharge flow side at the outer position 3. A temperature of 230° C. obtains at that moment in time, at the center and thus hottest position. The heating process stops immediately in the afflux side, with further transportation of the heat involved providing that the temperatures at the center 2 of the discharge flow side still further rise to 270° C. and at the edge 3 to 200° C. before they fall again. That operating procedure ensures that, in spite of the heat losses due to thermal conduction at the contact sides of the filter a temperature of at least 200° C. is reached in the entire region of the discharge flow side. The air temperature downstream of the filter reaches a maximum of 120° C. in this process, as can be seen from curve 1.

In the foregoing example an afflux speed of 0.15 m/sec was adopted in the desorption phase. In that case the power adopted for heating to the temperature of 230° C. at the center of the filter, upon attainment of the concentration maximum on the afflux side, was 35 W. That heating power can be reduced by further reducing the afflux speed. The desorption process however then lasts longer as the heating operation takes a longer time.

FIG. 7 shows the temperatures which occur at the center of the filter on the discharge flow side at different afflux speeds, for two set heating powers. It will be seen that, with a heating power of 9.8 W, the temperature of 200° C. is reached approximately (195° C.) only without a through flow. With an increasing through flow, heat is increasingly carried away so that respectively lower temperatures occur. With a heating power of 23 W the temperature of 200° C. is still reached at an afflux speed of 0.2 m/sec. The period of time for that however is more than 5 min. With a through-flow speed of 0.15 m/sec, the heating time can be reduced to less than 3 min.

The optimum for the regeneration process for the embodiment set forth is in a range of between 10 and 23 W for the heating power to be set and a range of between 0.1 and 0.15 m/sec for the through-flow speed. The minimum through-flow speed of 0.1 m/sec is necessary for transporting away the desorbed pollutants.

It is particularly advantageous if the above-described setting is selected and the desorption process is terminated upon the voltage being switched off by simultaneously raising the through-flow speed to 0.65 m/sec or higher. In that way, not only are the pollutants transported away more quickly, but the part of the filter, which in any case is hotter, involves once again a heat peak before the filter cools down again. The cooling process is also greatly speeded up in that way and thus lasts for less than a minute.

It is advantageously possible in that way to carry out a desorption procedure which can be implemented in a time of within 4 min.

It will be appreciated that the foregoing examples have been put forward solely by way of illustration of the present invention and that various other modifications and alterations may be made therein without thereby departing from the spirit and scope of the invention.

What is claimed is:

1. A controlled pore size/pore size distribution activated carbon molded body made by the process comprising: combining molded body constituents including activated carbon having a pre-selected pore size and pore size distribution, water, novolak powder, clay, cellulose ether, liquid starch, wax, polyacrylamide and soap, thoroughly mixing the constituents, extruding the mixture to afford a monolithic extrudate, cutting the extrudate to size, drying the cut extrudate, and pyrolyzing the dried extrudate to provide said molded body.

2. An activated carbon molded body as set forth in claim 1 wherein the mixture includes between 30 and 40% by weight of activated carbon between 23 and 34% by weight of water between 8 and 14% by weight of novolak powder between 5 and 50% by weight of clay between 0.5 and 5% by weight of cellulose ether between 5 and 10% by weight of liquid starch between 2 and 8% by weight of wax between 0.2 and 1.2% by weight of polyacrylamide, and between 1.0 and 2.5% by weight of soap.

3. An activated carbon molded body as set forth in claim 1 wherein between 10 and 50% by weight of the soap is replaced by graphite.

4. An activated carbon molded body as set forth in claim 1 wherein between 1 and 15% by weight of glass fibers with respect to the mass of said constituents is added to said starting mixture.

5. An activated carbon molded body as set forth in claim 1 wherein firstly the activated carbon is mixed with the novolak powder, then clay is added and further mixing is effected, and then the remaining constituents are added with further mixing.

6. An activated carbon molded body as set forth in claim 1 wherein the molded body is dried in a circulated-air oven at between 50 and 80° C.

7. An activated carbon molded body as set forth in claim 1 wherein the molded body is dried by microwave means.

8. An activated carbon molded body as set forth in claim 1 wherein the pyrolysis operation is effected at a temperature in the range of between 650° C. and 800° C. in a nitrogen atmosphere.

9. An activated carbon molded body as set forth in claim 1 wherein the temperature in the pyrolysis operation is increased until the final temperature is attained at a heating rate of 5 K/mm and the final temperature is maintained for between 5 and 30 mm.

10. An activated carbon molded body as set forth in claim 1 further comprising:

an activation step after the pyrolysis operation.

11. An activated carbon molded body as set forth in claim 11 wherein the activation step is effected at a temperature of between 700 and 950° C. and between 25 and 35% by volume of water vapor is meteredly added to the activation atmosphere.

12. An activated carbon molded body as set for the in claim 1, further comprising electrical contact elements arranged on the activated carbon molded body at a spacing from each other.

13. An activated carbon molded body as set forth in claim 13 wherein said electrical contact elements are disposed in mutually opposite relationship.

14. An activated carbon molded body as set forth in claim 1 which is in honeycomb form.

15. An adsorption filter comprising the activated carbon molded body as set forth in claim 1.

* * * * *

UNITED STATES PATENT AND TRADEMARK OFFICE
CERTIFICATE OF CORRECTION

PATENT NO. : 6,699,561 B2
DATED : March 2, 2004
INVENTOR(S) : Wolff

It is certified that error appears in the above-identified patent and that said Letters Patent is hereby corrected as shown below:

Column 10,
Line 34, now reads "5 K/mm" should read -- 5 k/min --;
Line 35, now reads "30 mm" should read -- 30 min --;
Lines 39-40, now reads "set forth in claim 11" should read -- set forth in claim 10 --;
Lines 50-51, now reads "set forth in claim 13" should read -- set forth in claim 12 --

Signed and Sealed this

Tenth Day of August, 2004

JON W. DUDAS
*Acting Director of the United States Patent and Trademark Office*